(12) United States Patent
Schwaderer

(10) Patent No.: US 11,947,686 B2
(45) Date of Patent: Apr. 2, 2024

(54) DYNAMICALLY ENCRYPTING AND DECRYPTING APPLICATION DATA USING DYNAMICALLY LINKED INTERPOSER MODULES

(71) Applicant: William D. Schwaderer, Sparks, NV (US)

(72) Inventor: William D. Schwaderer, Sparks, NV (US)

( * ) Notice: Subject to any disclaimer, the term of this patent is extended or adjusted under 35 U.S.C. 154(b) by 0 days.

(21) Appl. No.: 18/352,935

(22) Filed: Jul. 14, 2023

(65) Prior Publication Data
US 2024/0020394 A1    Jan. 18, 2024

Related U.S. Application Data

(60) Provisional application No. 63/368,446, filed on Jul. 14, 2022.

(51) Int. Cl.
*G06F 21/60* (2013.01)
*H04L 9/08* (2006.01)

(52) U.S. Cl.
CPC .......... *G06F 21/602* (2013.01); *H04L 9/0816* (2013.01)

(58) Field of Classification Search
CPC .............................. G06F 21/602; H04L 9/0816
See application file for complete search history.

(56) References Cited

U.S. PATENT DOCUMENTS

| | | | | |
|---|---|---|---|---|
| 2006/0015535 | A1* | 1/2006 | Buchsbaum | G06F 9/542 |
| 2007/0112972 | A1* | 5/2007 | Yonge, III | H04L 63/0478 709/231 |
| 2008/0107271 | A1* | 5/2008 | Mergen | G06F 21/6209 380/278 |
| 2010/0011447 | A1* | 1/2010 | Jothimani | G06F 21/6209 726/27 |
| 2014/0250534 | A1* | 9/2014 | Flores | G06F 21/6209 726/26 |
| 2015/0310219 | A1* | 10/2015 | Haager | H04L 9/0894 713/165 |
| 2019/0158271 | A1* | 5/2019 | Lowry | H04L 9/065 |
| 2023/0244389 | A1* | 8/2023 | Dai | G06F 3/067 711/163 |

* cited by examiner

*Primary Examiner* — Arezoo Sherkat
*Assistant Examiner* — Alan L Kong
(74) *Attorney, Agent, or Firm* — McCoy Russell LLP

(57) ABSTRACT

A computer-implemented method can include encrypting a data file as a multiplicity of independent segments that are each a multiple of a block encryption's block size, encrypting the application data on a segment-by-segment basis using the multiplicity of selected encryption methods and associated information, and creating a programming shared object "shim" Interposer module.

4 Claims, 10 Drawing Sheets

Program Execution using Shared Object Shim and libc Dynamic linking

Figure 1 – Demo.c: A Conceptual C Programming Language Input/Output Program

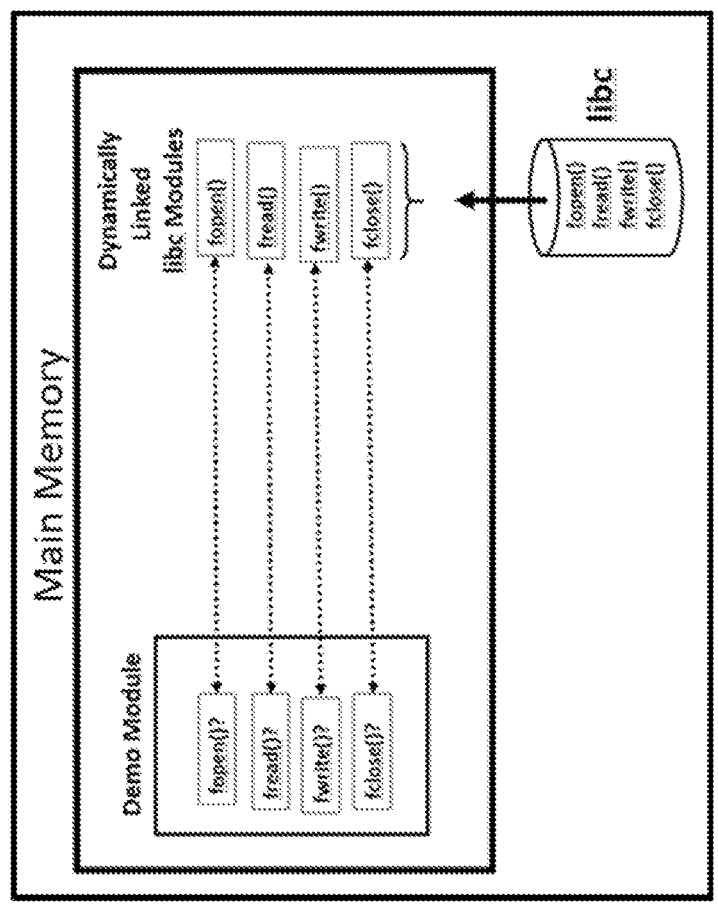
Figure 2 – Program Execution using libc library Dynamic Linking

Figure 3 – DemoShim.c File With Stubbed Function Logic

```
// DemoShim.c fopen() Example Logic

FILE *fopen(char *FileName, char *Mode) {

FILE *(*OriginalFopen)(char *Name, char *OpenMode) = dlsym(RTDD_NEXT, "fopen"));

FILE *FilePtr = OriginalFopen(FileName, Mode);

if (FilePtr != NULL)
        // Save FilePtr, Calling Parameters for Later References
        // Along with Decryption Method Information return FilePtr;
}
```

Figure 4 – Conceptual DemoShim.c Interposer Module fopen() Logic

```
// DemoShim.c fclose() Example Logic

FILE *fclose(FILE *Stream) { int (*OriginalFclose)(FILE *filePtr) = dlsym(RTDD_NEXT, "fclose");

return OriginalFclose(Stream);

}
```

Figure 5 – Conceptual DemoShim.c Interposer Module fclose() Logic

```
// DemoShim.c fread() Example Logic int fread(void *Bufferptr, size_t Size, size_t nmemb, FILE *stream) { int (*OriginalFread)(void *Bufferptr, size_t Size, size_t nmemb, FILE *Fileptr)
        = dlsym(RTOD_NEXT, "fread");

// Identify all independent encrypted block(s) containing requested data
    // Read   all independent encrypted block(s) containing requested data
    // If any read error occurs, return 0
    // Decrypt the independently encrypted block(s) containing the data ...
    //    using the encryption information stored by the Interposer Module's fopen()
    // Extract the requested data, move to caller's target buffer return nmemb;
}
```

Figure 6 – Conceptual DemoShim.c Interposer Module fread() Logic

```
// DemoShim.c fwrite() Example Logic int fwrite(void *BufferPtr, size_t Size, size_t nmemb, FILE *stream) { int (*OriginalFread)(void *BufferPtr, size_t Size, size_t nmemb, FILE *filePtr)
        = dlsym(RTDD_NEXT, "fwrite");

// Determine the current file position at entry
    // Identify the independent encrypted block(s) that will receive the data
    //    using the encryption information stored when the file was opened
    // Determine the file offset of the first block that will store any of the data
    // Read all independent encrypted block(s) that will receive any of the data
    // If any read error occurs, return 0
    // Decrypt the independent encrypted block(s) that will receive the data
    // Move the write data into the appropriate offsets within the unencrypted blocks
    // Independently encrypt the blocks using the encryption information stored
    //    when the file was opened and write them to their original offsets
    // Calculate the current file position at entry plus the requested write size
    // Set the current file position to the calculated value return nmemb;
}
```

Figure 7 – Conceptual DemoShim.c Interposer Module fwrite() Logic

```
BINS=Demo.out DemoShim.so        # The two files to build all: $(BINS)

%.out: %.c
	$(CC) $(CFLAGS) -o $@ $^

%.so: %.c
	$(CC) $(CFLAGS) -shared -fPIC -o $@ $^ -ldl clean:
	rm -f $(BINS)

# Runs As:
#     cc -o Demo.out Demo.c
#     cc -shared -fPIC -o DemoShim.so DemoShim.c -ldl
```

Figure 8 – makefile Build Script

```
LD_PRELOAD=./DemoShim.so ./Demo.out
```

Figure 9 – Command Line Command for DemoShim Support

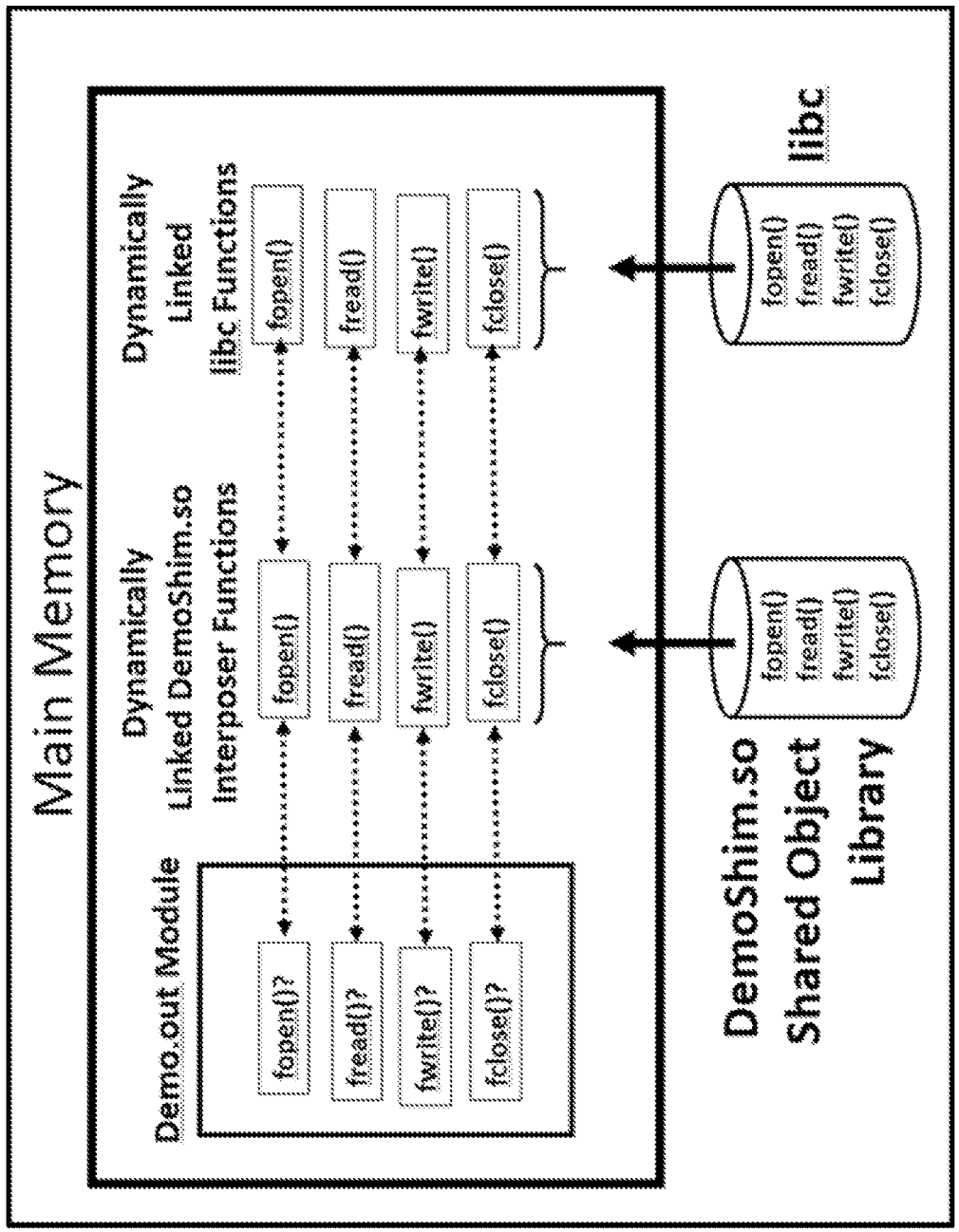
Figure 10 – Program Execution using Shared Object Shim and libc Dynamic linking

DYNAMICALLY ENCRYPTING AND DECRYPTING APPLICATION DATA USING DYNAMICALLY LINKED INTERPOSER MODULES

CROSS-REFERENCE TO RELATED APPLICATION

The present application claims priority to U.S. Provisional Application No. 63/368,446, entitled "DYNAMICALLY ENCRYPTING AND DECRYPTING APPLICATION DATA USING DYNAMICALLY LINKED INTERPOSER MODULES", and filed on Jul. 14, 2022. The entire contents of the above-listed application are hereby incorporated by reference for all purposes.

BACKGROUND AND SUMMARY

Programming practitioners, skilled in the art, will appreciate that a C programming language compiler traditionally provides a header file named "stdio.h". This header file describes several C programming functions and values an application program respectively invokes or needs but does not otherwise respectively implement or define in its source code. The execution logic for these invoked functions resides elsewhere, usually in a shared system library.

Example stdio.h referenced functions include, but not are necessarily limited to the following:
File Access
  fopen ( ), freopen ( )
  fflush ( ), fclose ( )
  setbuf( ), setvbuf( ), fwide( )
Direct Input/Output
  fread( ), fwrite( )
Unformatted Input/Output
  fgetc( ), getc( ), fgetwc( ), getwc( )
  fgets( ), fgetws( ),
  fputc( ), putc( ), fputwc( ), putwc( ),
  fputs( ), fputws( )
  getchar( ), getwchar( ),
  gets ( )
  putchar( ), putwchar( ),
  puts ( )
  ungetc( ), ungetwc( )
Formatted Input/Output
  scanf( ), fscanf( ), sscanf( ), wscanf( ), fwscanf( ), swscanf( )
  vscanf( ), vfscanf( ), vsscanf( ), vwscanf( ), vfwscanf( ), vswscanf( )
  printf( ), fprintf( ), sprint( ), snprintf( )
  wprintf( ), fwprintf( ), swprintf( )
  vprintf( ), vfprintf( ), vsprintf( ), vsnprintf( ), vwprintf( ), vfwprintf( ), vswprintf ( )
  perror ( )
File Positioning
  ftell( ), ftello( )
  fseek( ), fseeko( )
  fgetpos( ), fsetpos( ),
  rewind ( )
Error Handling
  clearerr( ), feof( ), ferror( )
Operations on Files
  remove( ), rename( ), tmpfil( ), tmpnam( )

Among other services, these functions, and others like them, provide application programs with on-demand capability to read, write, and update data stored in existing data files, as well as on-demand ability to create new files.

Traditionally, the actual executable logic for these library functions does not exist within a compiled application program module the operating system loads into memory for execution. Rather, the actual executable logic for these library functions traditionally resides in a "standard C library" commonly referred to as "libc". This library is a library of standard C library functions that the operating system's application loader dynamically loads, and links the application module to, when the operating system loads an application program module that requires them for execution.

As an example, an operating system can be an operating system such as a Linux variant operating system, though other operating systems have similar provisions that provide applications dynamically-linked library support.

BRIEF DESCRIPTION OF THE DRAWINGS

FIG. 1 illustrates an example of Demo.c: A Conceptual C Programming Language Input/Output Program in accordance with the present disclosure.

FIG. 2 illustrates an example of Program Execution using libc library Dynamic Linking in accordance with the present disclosure.

FIG. 3 illustrates an example of DemoShim.c File With Stubbed Function Logic in accordance with the present disclosure.

FIG. 4 illustrates an example of Conceptual DemoShim.c Interposer Module fopen( ) Logic in accordance with the present disclosure.

FIG. 5 illustrates an example of Conceptual DemoShim.c Interposer Module fclose( ) Logic in accordance with the present disclosure.

FIG. 6 illustrates an example of Conceptual DemoShim.c Interposer Module fread( ) Logic in accordance with the present disclosure.

FIG. 7 illustrates an example of Conceptual DemoShim.c Interposer Module fwrite( ) Logic in accordance with the present disclosure.

FIG. 8 illustrates an example of makefile Build Script in accordance with the present disclosure.

FIG. 9 illustrates an example of Command Line Command for DemoShim Support in accordance with the present disclosure.

FIG. 10 illustrates an example of Program Execution using Shared Object Shim and libc Dynamic linking in accordance with the present disclosure.

DETAILED DESCRIPTION

Aspects of the disclosure may operate on particularly created hardware, firmware, digital signal processors, or on a specially programmed computer including a processor operating according to programmed instructions. The terms controller or processor as used herein are intended to include microprocessors, microcomputers, Application Specific Integrated Circuits (ASICs), and dedicated hardware controllers.

One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device.

The computer executable instructions may be stored on a computer readable storage medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like.

Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or computer-readable storage media, which may be read and executed by one or more processors. Such instructions may be referred to as a computer program product. Computer-readable media, as discussed herein, means any media that may be accessed by a computing device. By way of example, and not limitation, computer-readable media may comprise computer storage media and communication media.

For discussion simplicity, the following invention description only discusses a Linux C programming GNU C compiler environment as an embodiment example. One having skill in the art will readily recognize that this is not intended to limit the invention's scope or applicability.

Figure 1:
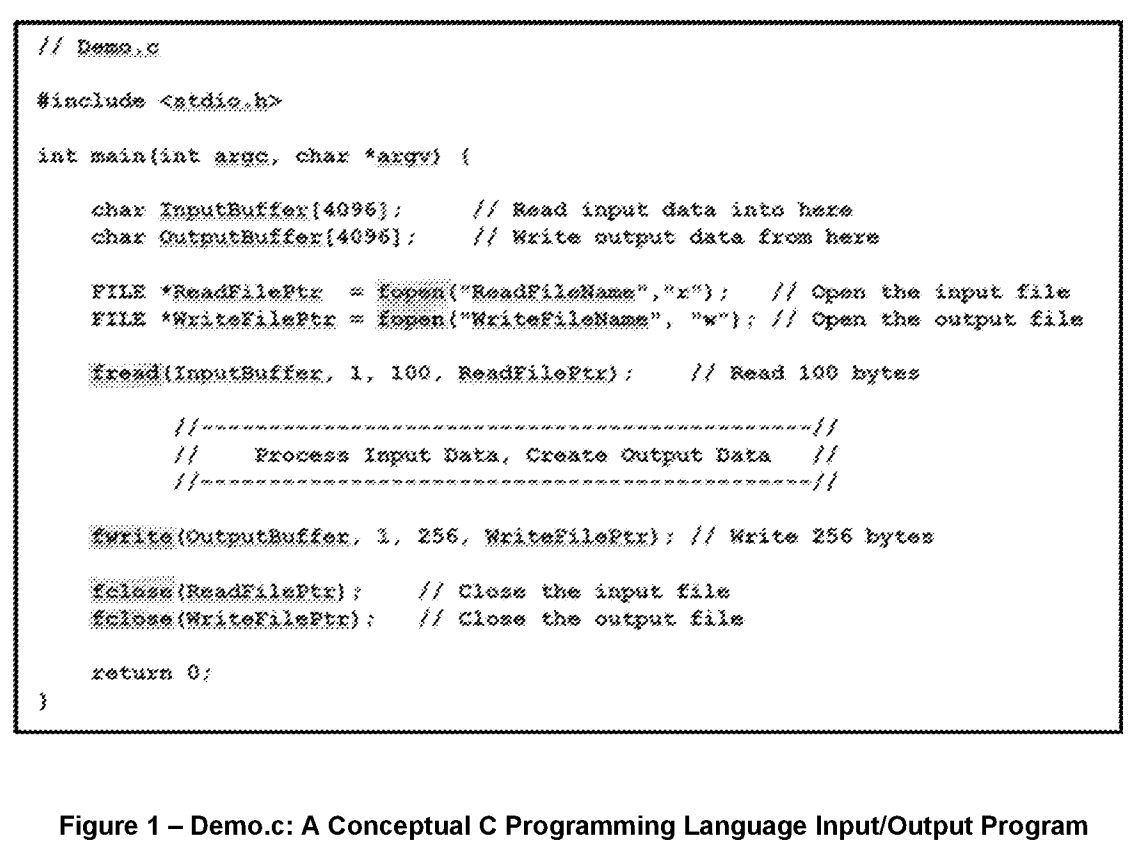

Programmers skilled in the art will appreciate that the example illustrated by FIG. 1 depicts a very simple, conceptual C programming language program named "Demo.c" that omits error checking when opening files.

Demo.c opens a file named "ReadFileName" for input, opens a file named "WriteFileName" for output, reads 100 bytes from the input file, processes it in some undescribed manner, writes 256 bytes of output data to the output file, closes both files, and exits.

Compiling Demo.c using the terminal command line command "gcc Demo.c-o Demo" provides an executable module named "Demo" which, when executed, and when a file named "ReadFileName" exists, produces an output file named "WriteFileName".

Executing the Demo program is possible by entering "./Demo" at a terminal command line when the compiled application file resides in the the same Linux current working directory.

FIG. 2 illustrates an example of how the program loader can resolve the fact that the Demo.c executable module does not have the necessary logic to perform fopen( ), fread( ), fwrite( ), and fclose( ) services. Specifically, to provide the necessary support, the loader traditionally dynamically links to the corresponding function support in libc.

Suppose it subsequently becomes necessary to ensure that all the application data that the Demo application module reads and writes is always encrypted when it resides on a storage device or is in transit to or from such a storage device.

Unfortunately, and for many reasons, it is not always easy or even possible to retrofit encryption and decryption programming logic into an existing program's source code. For example, perhaps the Demo.c source code has been lost or is otherwise unavailable due to a network server outage or source code licensing restriction.

This disclosure generally provides a mechanism to provide encryption and decryption support in many such instances.

A first step is to select a suitable encryption/decryption technology from the many that are available. Suppose the widely-used, internationally-standardized, AES-256 method is selected as an example embodiment implementation. In this example, the next step is to select a symmetric encryption/decryption key for the encryption process.

Practitioners, skilled in the art, will appreciate that AES-256 is a symmetric block cipher that operates on 16-byte blocks. Several other encryption methods use block encryption concepts similar to AES-256. Practitioners, skilled in the art, will also appreciate that many file encryption operations encrypt an entire file in one continuous encryption operation, using a selected key and associated key scheduling algorithm particular to the selected encryption means.

In contrast, this disclosure teaches that there can be significant benefit in encrypting the data file as a multiplicity of independent segments that are each a multiple of a block encryption's block size. Such an approach minimizes ciphertext expansion due to encryption padding and accelerates decryption operations. An additional performance improvement is possible by having the segments be a uniform size, except perhaps for the last segment. This convenience also reduces the amount of encryption information that must be stored and available for subsequent decryption operations.

The segmentation strategy, encryption method for each segment, value of the encrypting key for each segment, and the key scheduling information for each segment comprise a multiplicity of shared secrets that must be obfuscated or otherwise sequestered from unauthorized access. It must also be available for decryption operations. Suppose it is stored in a file named "DemoEnc.txt" as an embodiment example.

Next, the application data is encrypted on a segment-by-segment basis using the multiplicity of selected encryption methods and associated information. Since each segment is independently encrypted, each segment number optionally can be algorithmically combined with the designated encryption key, perhaps by concatenation means or hashing. This can optionally produce a unique encryption key for each segment with each segment optionally encrypted using a different encryption method means.

One having ordinary skill in the art will recognize that an application module can contemporaneously access multiple files and that this invention allows each file to be encrypted completely differently.

Next, it is necessary to create a programming shared object "shim" Interposer module for the Demo executable module. With appropriate planning, this interposer module can be shared with other applications accessing data that is encrypted in the same manner as the Demo application. The shared object shim Interposer module will intercept Demo application module calls to "fopen", "fread", "fwrite", "fclose", and any other functions required to support Input/Output encryption and decryption activities. It will reflect the calls to traditional libc function modules for actual Input/Output operations, capture file access state change, encrypt/decrypt application data, and pass the results to the calling application module transparently.

Figure 3:
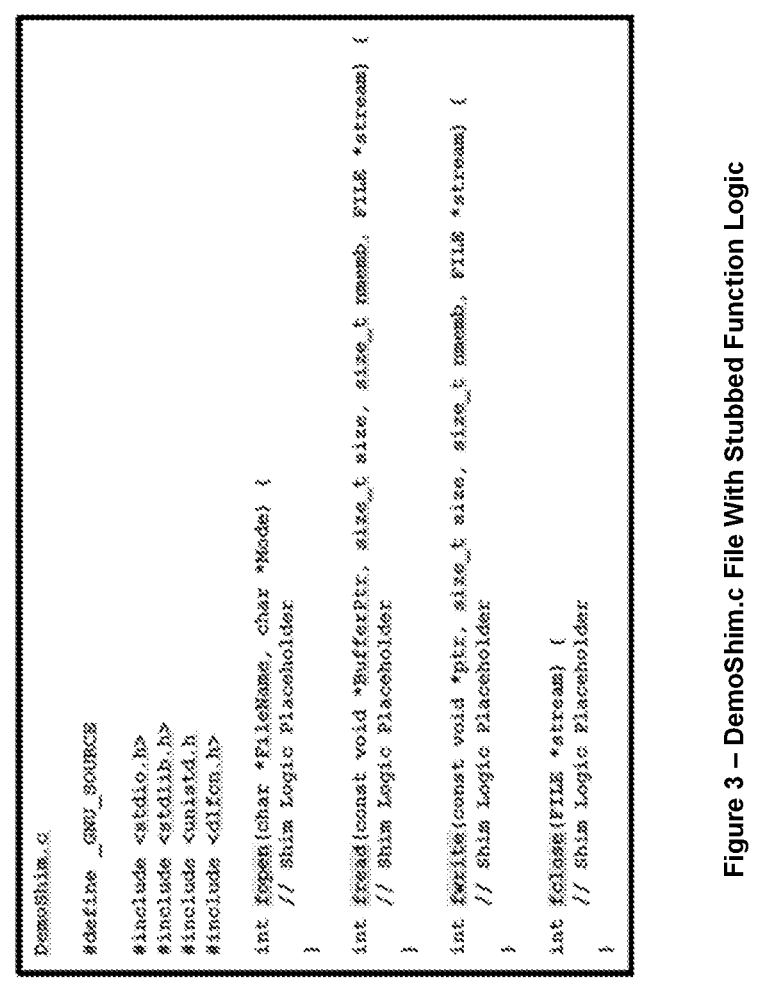

Suppose the shared object shim Interposer module source code is named "DemoShim.c". Attentive readers will note that the function names "fopen", "fread", "fwrite", and "fclose" are highlighted in FIG. 1. Hence, in the example, and as depicted in FIG. 3, DemoShim.c will also have functions with those names which are similarly highlighted.

For discussion simplicity, the following discussion only discusses those functions. It is to be understood that several other file Input/Output functions, such as the fscanf( ) function, may require similar considerations but are intentionally omitted from this description for discussion simplicity.

In FIG. 3, each stubbed "Shim Logic Placeholder" logic component must be provided.

FIG. 4 depicts conceptual logic required to complete the fopen( ) Shim Logic Placeholder. Note that there is a provision to save the generated file pointer, as well as the calling parameters the Interposer module's fopen( ) function received, and the required file encryption information the Interposer module's fopen( ) function retrieved and stored.

Saving the generated file pointer with associated encryption information is necessary since each accessed file may have different encryption methods or encryption parameters. Subsequent read and write requests will reference the file pointer, allowing the Interposer module to identify its encryption method and parameters.

FIG. 5 depicts the conceptual logic required to complete the fclose( ) Shim Logic Placeholder.

FIG. 6 depicts the conceptual logic required to complete the fread( ) Shim Logic Placeholder.

FIG. 7 depicts the conceptual logic required to complete the fwrite( ) Shim Logic Placeholder.

FIG. 8 depicts a makefile that compiles the C source code files with the correct compiler flag settings, creating the Demo.out and DemoShim.so modules.

FIG. 9 depicts an example terminal command line command that allows the shared object shim Interposer module to provide encryption/decryption services to an executing Demo application instance, assuming the modules are built as FIG. 8 describes.

Following this command, the Demo.out application module now operates with the DemoShim.so shared object shim Interposer Module as depicted in FIG. 10. This enables an unmodified Demo application instance to read and write data that is always encrypted while residing on, or traveling to/from, the storage means.

Practitioners, skilled in the art, will appreciate that there are many environments that support analogous Interposer Module strategies that this discussion does not mention. For example, an interposer module can access an augmented DemoEnc.txt file which contains CRC values an application can reference to perform a data integrity verification for each segment. Such environments may use different terminology and implementation details.

It to be understood, the forgoing discussion limits discussion for explanation simplicity and the scope of this disclosure includes such environments.

It will be appreciated that variants of the above-disclosed and other features and functions, or alternatives thereof, may be combined into many other different systems or applications.

Various presently unforeseen or unanticipated alternatives, modifications, variations, or improvements therein may be subsequently made by those skilled in the art which are also intended to be encompassed by the following claims.

The invention claimed is:

1. A shim method that can intercept application file access requests, the shim method comprising:

a shim intercepting a first application open file request to an operating system to open a file with a name specified as a first application open file request parameter;

the shim invoking a second open file request to the operating system to open a metadata file with a different filename in order to obtain existing file encryption specifications for the file name specified as a first application open file request parameter;

responsive to the second open file request successfully opening an existing metadata file, the shim reading the metadata file to obtain file encryption specifications for the file specified as a first application open file request parameter, and retaining the metadata describing an encryption method and parameters for the file specified as a first application open file request parameter;

the shim reflecting the first application open file request to an operating system library support routine by using a third open file request that passes parameters associated with parameters specified in the first application open file request;

the shim receiving a standard file open request file pointer value or other identifier in response to the third open file request;

the shim retaining the file pointer value or identifier received in response to the third open file request;

the shim associating the file pointer value or identifier received in response to the third open file request with retained descriptive metadata describing the encryption method and parameters for the file specified as a first application open file request parameter; and the shim returning the file pointer value or identifier received in response to the third open file request to the application.

2. The shim method of claim 1, further comprising:

the shim intercepting a first application file read request to the operating system that specifies a file pointer value or other identifier as a request parameter;

the shim using the file pointer value or other identifier specified in the first application file read request to search for and identify shim-retained descriptive metadata describing an encryption method and parameters for an encrypted file it associates with the first application file read request;

responsive to identifying shim-retained descriptive meta data describing the encryption method and parameters for the file associated with the first application file read request, the shim invoking a second file read request to the operating system with the file pointer value or other identifier of the encrypted file to retrieve encrypted data from the encrypted file, the shim retrieving encrypted data and decrypting the retrieved encrypted data to obtain plaintext data;

responsive to not identifying retained descriptive metadata describing the encryption method and parameters for the file associated with the read request, the shim invoking a second file read request to the operating system using the file pointer value or other identifier specified in the first application file read request to retrieve unencrypted plaintext data from the file;

the shim retaining a return code of the second file read request;

the shim placing the unencrypted plaintext data or retrieved plaintext data in a buffer location specified in the first application file read request; and the shim generating a response to the first application file read request by returning the return code of the second file read request to the application.

3. The shim method of claim 1, further comprising:

the shim intercepting a first application file write request to the operating system that specifies a file pointer value or other identifier as a request parameter;

the shim using the file pointer value or other identifier specified in the first application file write request to search for and identify shim-retained descriptive metadata describing an encryption method and parameters for an encrypted file it associates with the first application file write request;

responsive to identifying shim-retained descriptive meta data describing the encryption method and parameters for the file associated with the first application file write request, the shim encrypting the plaintext data specified in the first write request and invoking a second file write request to the operating system with the file pointer value or other identifier of the encrypted file to write the shim-encrypted data to the encrypted file;

responsive to not identifying shim-retained descriptive metadata describing the encryption method and parameters for the file associated with the write request, the shim invoking a second file write request to the operating system using the file pointer value or other identifier specified in the first application file write request to write unencrypted plaintext data to a file;

the shim retaining a return code of the second file write request; and the shim generating a response to the first application file write request by returning the return code of the second file write request to the application.

4. The shim method of claim 1, further comprising:

the shim intercepting a first application file close request to the operating system that specifies a file pointer value or other identifier as a request parameter;

the shim invoking a second file close request to the operating system using the file pointer value or other identifier specified in the first application file close request to close the file; and the shim generating a response to the first application file close request by returning a return code of the second file close request to the application.

* * * * *